United States Patent [19]

Ross et al.

[11] 3,748,471
[45] July 24, 1973

[54] FALSE COLOR RADIANT ENERGY DETECTION METHOD AND APPARATUS

[75] Inventors: Donald S. Ross, Los Altos; Lisle H. Roberts, Sunnyvale, both of Calif.

[73] Assignee: International Imaging Systems, Mountain View, Calif.

[22] Filed: Sept. 24, 1971

[21] Appl. No.: 183,378

[52] U.S. Cl.................. 250/333, 250/340, 250/349
[51] Int. Cl............................................... G01j 3/00
[58] Field of Search................ 250/83.3 H, 83.3 HP

[56] References Cited
UNITED STATES PATENTS

| 3,076,961 | 2/1963 | Bibbero | 250/83.3 H X |
| 3,405,268 | 10/1968 | Brunton | 250/83.3 H |
| 3,610,932 | 10/1971 | Morse et al. | 250/83.3 HP X |

Primary Examiner—Archie R. Borchelt
Attorney—Lowhurst & Hamrick

[57] ABSTRACT

Visible and non-visible radiation reflected from an object is electronically detected and used to develop at least two separate false colored images of the object which are then combined to produce, in real-time, a composite false colored image highlighting those portions of the object having a high degree of reflectance in the non-visible spectrum.

11 Claims, 5 Drawing Figures

INVENTORS
DONALD S. ROSS
LISLE H. ROBERTS

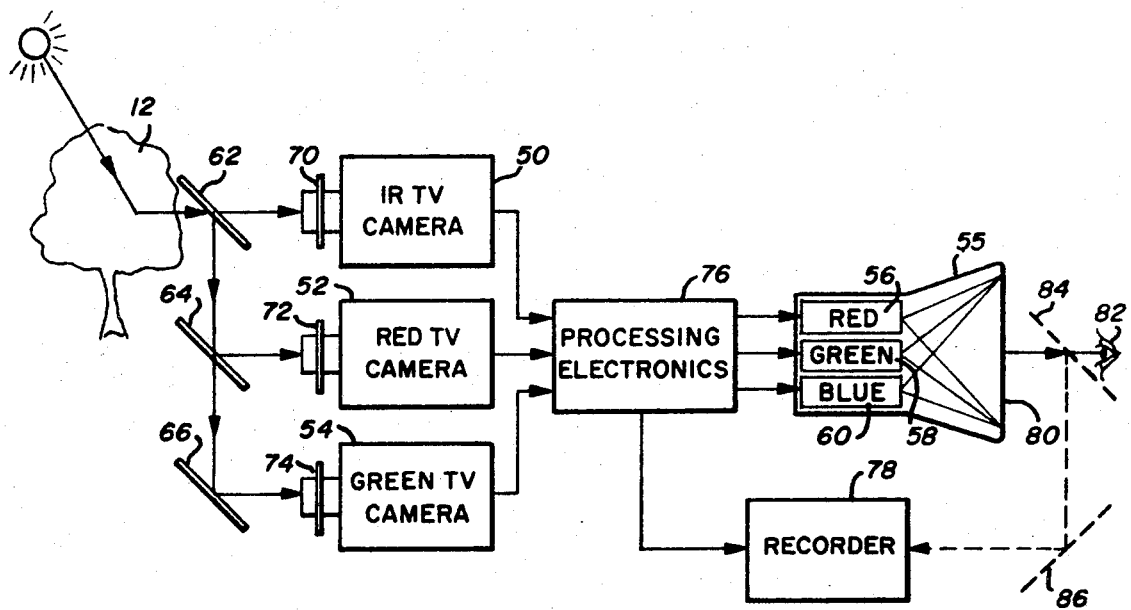
Fig_4
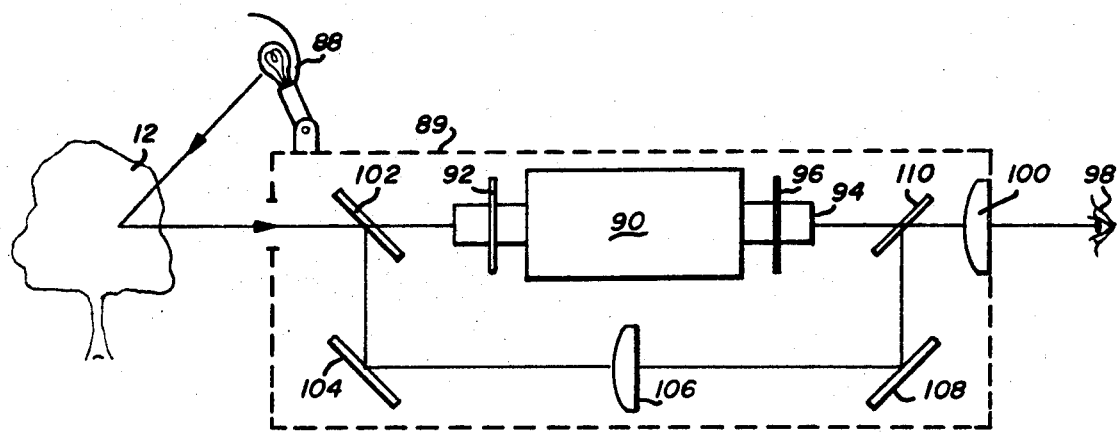
Fig_5

FALSE COLOR RADIANT ENERGY DETECTION METHOD AND APPARATUS

BACKGROUND OF THE INVENTION

1. Field of the Invention

The present invention relates to a method and apparatus for developing, on a real-time basis, a visible image of subject matter that highlights selected characteristics thereof which are otherwise invisible to the naked eye.

2. Discussion of the Prior Art

It is well known that certain substances have a high reflectance for radiant energy having wavelengths lying outside of the visible spectrum. In some cases, the degree of the reflectance is also indicative of certain characteristics of the reflecting substances. For example, oil on water and certain atmospheric pollutants exhibit a high degree of reflectance of radiant energy having wavelengths in the near ultra-violet region of the spectrum, and plants, trees, algae and other substances, which depend for life on chlorophyllic photosynthesis reactions, have substantial reflection for incident radiation in the near infra-red spectral region.

Although the detection of non-visible radiation in the ultra-violet spectrum has found some application in the prior art, the use of infra-red photography has gained wide acceptance as a means of distinguishing real plant life from camouflage in military applications, as a means of differentiating between disiduous trees and evergreens in certain agricultural applications, and as a means of monitoring disease of growth conditions of certain plant life.

When recorded by photographic infra-red sensitive material the apparent brightness of the infra-red reflectance can be qualitatively and quantitatively measured in terms of the photographic densities developed in the film. The infra-red photo record, when suitably converted by dyes of colors contrasting with similar images obtained in other non-infra-red photo records, can be combined to produce a false colored composite image for use in differentiating plant species and other factors such as relative vigor, plant disease and general condition. Heretofore, it has been necessary to obtain these false colored images by using special mono-pak color films or by using a plurality of individual cameras filtered to simultaneously record the same object seen in different discrete spectral regions including photographic infra-red.

An informative discussion of the botanical uses of infra-red photography can be found in the book by Walter Clark entitled *Photography By Infra-Red;* John Wiley & Sons, Second Edition 1947, pp. 253–265. A discussion of light reflectivity at the blue end of the spectrum can be found in the publication by D.S. Ross, 1970, entitled "Blue Multispectral Region in Aerospace Imaging," *Proceedings, 15th Annual Technical Symposium*, Society of Photo-Optical Instrumentation Engineers, pp. 149–155. These publications are hereby expressly incorporated by references into this disclosure.

A serious disadvantage of using photography as an investigative tool is that real-time inspection of a particular object can not be made, and it is only after subsequent development and reproduction of the photographic images that this means can be used to advantage. This, of course, substantially limits the effectiveness of the detection since conditions may change substantially between the time the photograph is taken and the time that they are available for interpretation.

SUMMARY OF THE PRESENT INVENTION

It is therefore an object of the present invention to provide a method and apparatus for enabling selected subject matter to be inspected on a real-time basis to detect characteristics which are otherwise invisible to the naked eye. Briefly, the present invention includes a method and apparatus whereby radiant energy in the visible and non-visible spectrum reflected from an object is photo-electrically detected and used to develop a composite false colored image of the object which highlights those portions of the object having high reflectance for certain non-visible radiant energy.

An advantage of the present invention is that real-time inspection can be made of selected subject matter to immediately determine the presence of polluting conditions, such as oil on water or certain gases in the atmosphere, or foilage disease or stage of growth. In addition, the detected conditions can be electrically recorded for subsequent re-evaluation or comparison.

These and other advantages of the present invention will no doubt become apparent to those of ordinary skill in the art after having read the detailed disclosure of the present invention which is illustrated in the several figures of the drawing.

IN THE DRAWING

FIG. 4 is a schematic diagram of an alternative embodiment for implementing a method in accordance with the present invention.

FIG. 5 is a schematic diagram of still another alternative embodiment for implementing a method in accordance with the present invention.

DETAILED DESCRIPTION OF THE PREFERRED EMBODIMENT

Figure 1:
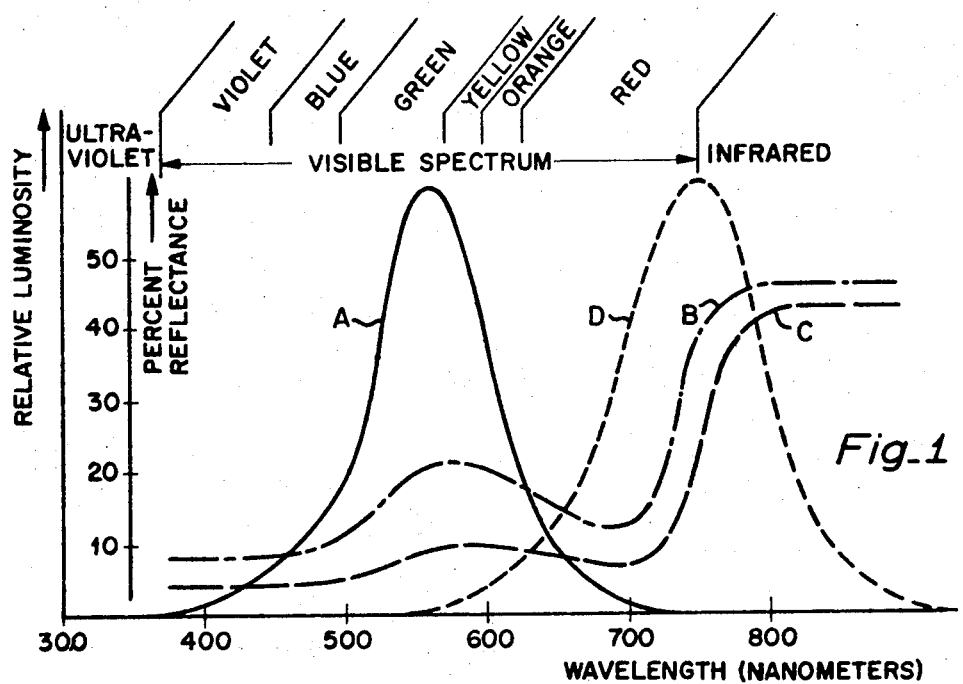
FIG. 1 is a diagram schematically illustrating the relative color sensitivity characteristic of the average human eye and the reflectance characteristics of certain green plant life.

Referring now to the diagram shown in FIG. 1 of the drawing, curve A illustrates the relative color sensitivity characteristic of an average human eye under bright illumination, while curves B and C illustrate respectively, the percentages of incident radiant energy reflected internally and externally at the various wavelengths by green plant life. The curves B and C used herein to illustrate generally the character of the reflectance of healthy green plant life are those of a healthy maple leaf. Similar curves for other types of leaves may be found in the above referenced Clark publication.

When sunlight falls on a leaf, part of the incident radiation is reflected externally by the upper surface, part of it is reflected internally by the internal structure of the leaf, part of it is absorbed by the materials of the leaf, and the rest is transmitted through the leaf. As can be seen from curves B and C, the reflectance is typically at a minimum in the blue region of the spectrum, rises in the green region, and then drops to another minimum in the dark end of the visible spectrum. However, beyond the visible spectrum the leaf exhibits a very high reflecting power, particularly in the near infra-red region. Although curves B and C are herein considered as typical of healthy green plant life, the reflectance characteristics do vary somewhat from one kind of leaf to another due to the different physical structures of the different species of leaves. The reflectance characteristics also vary depending upon the time of the year, the conditions under which the plant grows, and the lighting and other conditions under which the reflectance measurements are made.

The rather sharp increase in the reflectance of radiation having wavelengths above 700 nanometers makes possible the prior art photographic detectiom methods discussed above, as well as the electronic detection method which will now be discussed generally by referring to FIG. 2 of the drawing, and then more specifically with regard to certain presently preferred embodiments shown schematically in subsequent figures.

Radiation from a broad-band source, such as the sun, which is indicated at 10, or a suitable artificial source such as a tungsten filament lamp, cast onto plant life such as the tree indicated at 12, will be reflected, and if collected by suitable means including the filters 11 and 13, can be used to develop black and white images 14 and 16 whose tonal shades are directly related to radiation in a visible band of the spectrum and radiation in a non-visible band of the spectrum, respectively. As may be deduced from the brief discussion above, the tonal characteristics of the respective images will differ depending upon the reflectance characteristics of the tree 12. For example, if image 14 is made in response to visible radiation limited to a narrow band in the red portion of the spectrum, there may be little difference in the tonal shading of the image if the tree appears healthy to the naked eye. However, if one portion (a) of the tree 12 is actually quite healthy, but another portion (b) thereof, is in fact unhealthy, even though its appearance differs little from part (a), then the image 16 will not appear to be of uniform tonal quality. Since healthy plant life reflects infra-red radiation substantially more than non-healthy plant life, the portion (a') of image 16 would be expected to be lighter in tone than the portion (b').

Although a simple visual comparison of image 16 to tree 12 might be of some assistance in determining the condition of the tree, such comparison would require the alternate viewing of the tree and image, and would be somewhat inconvenient. A single composite image including the data contained in both of the images 14 and 16, while still allowing differentiation of the two sets of data would be much easier to view and interpret.

Thus, in accordance with the present invention, means such as the filter 15 is provided for tinting the image 14 with one visible color, such as green, and means such as the filter 17 is provided for tinting the image 16 with another visible color, such as red, and the two colored images are then combined to form the composite false colored image 18. In the illustrated example, the portion (a'') of image 18, which corresponds to the more healthy portion (a) of tree 12 would tend to appear more red in color than the portion (b'') corresponding to the less healthy portion (b), which would tend to appear more green (or perhaps brown) in color. The color sensitivity of the image could, of course, be varied by adjusting the relative intensities of the individual images used to form the composite image.

Figure 2:
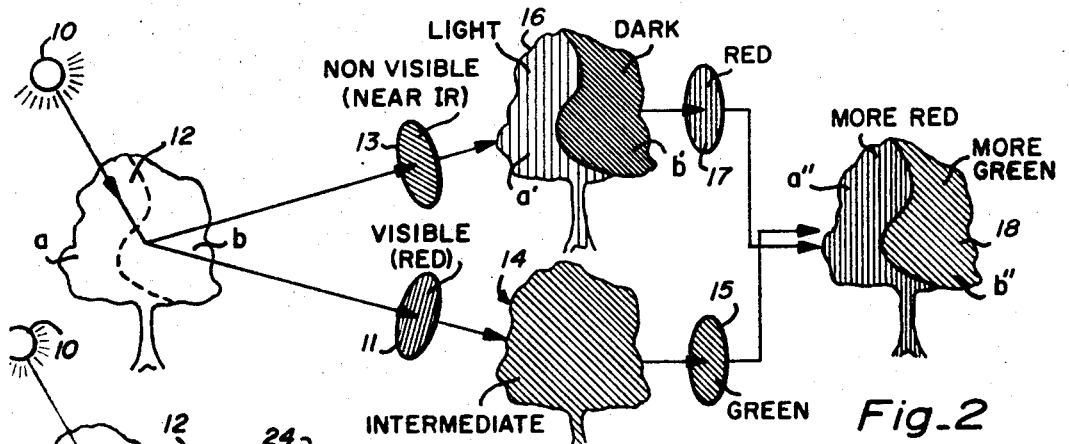
FIG. 2 is a diagram schematically illustrating a method in accordance with the present invention.

In the interest of simplicity, the diagram of FIG. 2 illustrates a single tree 12. However, the present invention may also be used to view, perhaps from an aerial vantage point, a large number of trees or other plants so as to determine the relative growth or health characteristics of the plants within the various sections of a field, grove, forest, etc.

Figure 3:
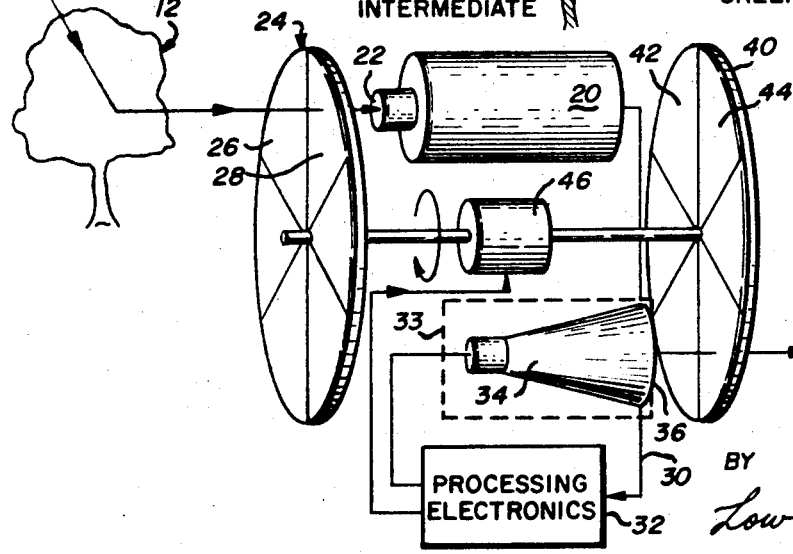
FIG. 3 is a schematic diagram illustrating one embodiment for implementing a method in accordance with the present invention.

A simplified embodiment for implementing the present invention is illustrated in FIG. 3, and incudes a wide-band television camera 20 including a video tube having a spectral sensitivity spanning the visible and certain non-visible wavelengths. An example of a video tube having a spectral response to radiation in the visible as well as the near IR wavelengths is the Tivicon Image Tube, manufactured by the Texas Instrument Corporation of Dallas, Tex. A filter wheel 24 including alternately disposed filter segments 26 and 28 is positioned near the input optics 22 of camera 20 so as to alternately admit radiation in a visible region, eg., of red wavelength, and radiation in non-visible region of the spectrum, eg., of near IR wavelength, as it is rotated. With filter wheel 24 appropriately synchronized with the scanning rate of camera 20, electrical signals will be developed on line 30 which alternately correspond to images developed by visible and infra-red radiation reflected from object 12.

The signals developed by camera 20 are fed into an electrical processing unit 32 which converts them into a form suitable for driving a black and white monitor 33 including a CRT viewing tube 34 having a display face 36. Tube 34 is positioned so that it may be viewed by an observer at 38 through a second filter wheel 40. Filter wheel 40 also includes alternating filter sections 42 and 44, but these filters are designed to color the images viewed by the observer in contrasting colors such as red and green. Filter wheels 24 and 40 are so aligned with respect to camera 20 and CRT 34 and driven in synchronism with each other such that when radiation in the IR band is admitted to camera 20, the red filter section 42 of wheel 40 is disposed in front of the face 36 of CRT 34, and when radiation in the red band is admitted to camera 20, the green filter section 44 is disposed in front of CRT face 36. Filter wheels 24 and 40 are driven by a common drive means, such as the motor 46, in the response to drive signals developed by the electrical processing unit 32.

In operation, with filter wheels 24 and 40 turning fast enough to project images at a rate above the perceptive rate of the human eye, i.e., 30 images or more per second, the effect is to provide a single composite image for view by the observer. This false colored image will correspond to the image 18, mentioned above with regard to FIG. 2, and will provide a means of inspecting the reflectance characteristics of object 12 and thus evaluating its condition.

Turning now to FIG. 4 of the drawing, an alternative embodiment in accordance with the present invention is illustrated in which three television cameras 50, 52 and 54 are used to develop electrical signals for driving the three ion guns 56, 58 and 60 of a conventional color television receiver tube 55. Beam splitting mirrors 62 and 64, and a reflector 66, or other suitable means, are used to direct reflected radiation from the object 12 into the input lenses of the three television cameras.

Through the use of filters 70, 72 and 74 in the input optics of the respective cameras, the radiation to which each camera responds is selectively limited to a particular portions of the spectrum. For example, filter 70 permits only radiation in the near IR portion of the spectrum to enter camera 50, filter 72 permits only radiation in the red portion of the spectrum to enter camera 52, and filter 74 permits only radiation in the green portion of the spectrum to enter camera 54. The video tubes used in the respective cameras 50, 52 and 54 must therefore be selected to have good sensitivity to the particular input radiation. Whereas the well known Plumicon or Vidicon tubes may be used in cameras 52 and 54, a Tivicon image tube, or its equivalent having good near IR response should be used in camera 50. For system uniformity, the cameras 50, 52 and 54 may be of a single type, such as the Standard IV Model manufactured by the Sierra Scientific Corporation of Mountain View, Calif., since such camera is adapted for use with many of the standard video camera tubes.

The output signals developed by the several cameras 50, 52 and 54 are input to suitable processing electronics 76 which develop the required signals for driving the red, green and blue ion guns of tube 55. Processing electronics 76 may also develop a suitable output for driving a video recorder 78 for storing the image viewed in real-time on the face 80 of tube 55 by an observer at 82. Alternately, the recorder 78 may be of a type which photographically records the image developed on tube face 80. In such case, a suitable beam splitter 84 and reflector 86 would be provided.

Note that since this embodiment develops a false colored image of the object 12 using the three primary colors, red, green and blue, the system might be thought of as having the capability of shifting the eye sensitivity curve A of FIG. 1 toward the red end of the spectrum, such as is indicated by the dashed curve D. Where the apparatus is used to inspect green plant life, it will be appreciated that because of the nature of the curves B and C illustrated in FIG. 1, those portions of the object which exhibit healthy growth characteristics will be predominantly red in the image developed on tube face 80.

In FIG. 5 of the drawing still another embodiment of the present invention is schematically illustrated. This embodiment includes a source 88 of artificial illumination and a viewer 89 which may be battery powered so as to make it suitable for certain portable applications. Viewer 89 includes a high resolution infra-red viewing device 90, such as the Model IRV-7002 manufactured by the Electro-Physics Corporation of Nutley, New Jersey. The input optics of device 90 includes a filter 92 for selectively admitting only that radiation from object 12 which is in a band of wavelengths in the near IR region. The radiation input through beam splitter 102 and filter 92 is projected onto the photo-cathode of a converter tube which reproduces an "IR image" of the object in visible form on a phosphor screen at the output end of the device, and light from the phosphor screen is imaged through output optics 94, including a suitable color filter 96, for view by an observer at 98.

In order to provide a second "visible image" of object 12 for combination with the IR image, the beam splitter 102, reflector 104, suitable optics 106, reflector 108, and half-silvered mirror 110 are suitably positioned to project an image of object 12 through eyepiece 100 in registry with the IR image. The resultant light rays passing through eyepiece 100 combine to produce a composite false colored image similar to that produced in the previously described embodiments. As in the previous embodiments, the composite false colored image viewed by the observer at 98 will indicate those portions of object 12 having different IR reflectivity characteristics than other portions. Apparatus such as this are highly useful to foresters, nurserymen and others concerned with making on-the-spot evaluations of plant growth or disease conditions.

The present invention may be implemented using any suitable real-time image generating apparatus capable of developing several spectrally different images of the same object which can be either electrically or optically combined into a single composite image that accentuates certain characteristics of the object which would otherwise be undetectable by the naked eye. The recent development of silicon target video tubes, such as the Tivicon image tube, has substantially contributed to making the implementation of the present invention practical. Using a device such as the Tivicon image tube, which is responsive to radiation outside the visible spectrum, in combination with other prior art imaging devices, separate images of radiation in the visible and non-visible spectrum can be manipulated and combined, as described above, to develop a composite image of a type that makes it relatively simple to detect phenomena which could heretofore only be detected using laborious and expensive prior art photographic techniques.

Since in accordance with the present invention, the several images are combined and simultaneously displayed to the user, even as the camera is pointed at and moved around to view different parts of a scene or object, the user may change spectral filters on one or more of the viewing cameras or display devices to emphasize and enhance the image to facilitate interpretation thereof. Moreover, control over contrast and image brightness can be exercised by the user both in the camera system and display system as a further aid to image interpretation.

Furthermore, in accordance with the present invention, where two or more television cameras are operating in different spectral regions, the video signals from each camera may be mixed to reduce redundant spectral information which is similar in the different video camera channels. This may be accomplished by reversing the polarity of one video signal relative to another and then adding the two algebraically. Thus, when a positive image is added to a negative image, both being in different spectral bands, and when the relative scene contrasts are matched, all reflectance which is common to both will be cancelled and the remaining video signal will then represent the difference in the spectral reflectance. Using this technique, which may be analogized to photographic masking processes, the identification and discrimination of chlorophyll can be improved by removing distracting image information from the scene.

In either the aforementioned masking mode or in the conventional operation, the video signal from one or more of the cameras may be pre-processed before display by using digital or other means for converting preselected video signal levels in order to form displayed contours representing stepwise relative or quantitative reflectance levels in the infra-red record or its associated images from other spectral channels.

Although one of the primary advantages of the present invention is its ability to enable an object to be examined in real-time, various types of apparatus for recording the displayed images can also be embodied in the system. For example, video recordings can be made for later playback or analysis by computer techniques, or the data can be photographically recorded on either color or black-and-white film for later interpretation or use.

Whereas the present invention has been disclosed above in terms of specific embodiments, it is contemplated that certain modifications thereof will be apparent to those of ordinary skill in the art after having read the above disclosure. Accordingly, this disclosure is not intended to be limiting and the appended claims are to be interpreted as covering all such modifications as fall within the true spirit and scope of the invention.

What is claimed is:

1. A false color detection method comprising the steps of:
    photo-electrically detecting radiant energy in the visible spectrum emanating from an object and developing a first electrical signal commensurate therewith;
    photo-electrically detecting radiant energy in the non-visible spectrum emanating from said object and developing a second electrical signal commensurate therewith;
    converting said first electrical signal into a first image of a first color;
    converting said second electrical signal into a second image of a second color; and
    combining said first and second images to develop a composite visible image in real time from which certain characteristics of said object can be determined.

2. A false color detection method as recited in claim 1 wherein at least said second color is a false color.

3. A false color detection method as recited in claim 1 wherein the detected non-visible radiant energy has wavelengths greater than 700 nanometers.

4. A false color detection method as recited in claim 1 and further including the step of illuminating said object with visible and non-visible radiation developed by an artificial source.

5. A false color detection method comprising the steps of:
    illuminating an object with radiant energy having wavelengths in both the visible and non-visible portions of the spectrum;
    photo-electrically detecting visible radiant energy reflected from said object and developing a first electrical signal commensurate therewith;
    photo-electrically detecting non-visible radiant energy reflected from said object and developing a second electrical signal commensurate therewith; and
    converting said first and second signals into a false color composite visible image in real time highlighting certain non-visible characteristics of said objects.

6. A false color detection method as recited in claim 5 wherein the detected non-visible radiant energy has wavelengths greater than 700 nanometers.

7. A false color detection method as recited in claim 5 wherein said composite image is formed by converting said first electrical signal into a first image of a first color and converting said second electrical signal into a second image of a second color, and then combining said first and second images.

8. A method of inspecting plant life in the presence of natural illumination to determine particular characteristics thereof comprising the steps of:
    photo-electrically detecting radiant energy reflected from the plant life having wavelengths of less than 700 nanometers and developing a first electrical signal commensurate therewith;
    photo-electrically detecting radiant energy reflected from the plant life having wavelengths of greater than 700 nanometers and developing a second electrical signal commensurate therewith;
    developing first and second different colored images of the plant life from said first and second electrical signals, respectively; and
    combining said first and second images to develop a false color composite visible image in real time of the plant life.

9. Apparatus for detecting certain characteristics of an object, comprising:
    means responsive to non-visible radiant energy emanating from the object and operative to develop a first visible image commensurate therewith, said first image having a selected false color;
    means responsive to visible radiant energy emanating from said object and operative to develop a second visible image of said object; and
    means responsive to said first and second images and operative to develop a false colored visible composite image of said object in real time from which said characteristic can be determined.

10. Apparatus for the viewing in real time the visible and non-visible radiation from an object comprising
    means for converting the visible radiation into a first black and white image,
    means for converting the non-visible radiation into a second black and white image,
    means for converting said first black and white image into a first false color image,
    means for converting said second black and white image into a second false color image, and
    means for combining said first and second false color images into a composite color image visible in real time.

11. Apparatus as claimed in claim 10 wherein said means for converting said visible and non-visible images into black and white images includes a television camera spanning the visible and non-visible spectrum, means for operating said television camera in time-share manner to produce alternately said two images, and means coupled to said latter means for synchronizing said combining means with the alternating black and white images produced by said television camera.

* * * * *